US008750850B2

(12) United States Patent  
Gupta

(10) Patent No.: US 8,750,850 B2
(45) Date of Patent: Jun. 10, 2014

(54) CONTEXT-AWARE MOBILE INCORPORATING PRESENCE OF OTHER MOBILES INTO CONTEXT

(75) Inventor: Rajarshi Gupta, San Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 12/715,731

(22) Filed: Mar. 2, 2010

(65) Prior Publication Data

US 2011/0177802 A1 Jul. 21, 2011

Related U.S. Application Data

(60) Provisional application No. 61/295,992, filed on Jan. 18, 2010.

(51) Int. Cl.
*H04M 3/00* (2006.01)

(52) U.S. Cl.
USPC ........ 455/418; 455/420; 455/41.2; 455/456.1

(58) Field of Classification Search
USPC ........ 455/418–420, 404.2, 411, 414.1, 414.2, 455/448, 41.1, 41.2, 456.1–456.6, 403, 455/404.1
See application file for complete search history.

(56) References Cited

U.S. PATENT DOCUMENTS

| 6,748,195 | B1 | 6/2004 | Phillips | |
|---|---|---|---|---|
| 6,968,179 | B1 | 11/2005 | DeVries | |
| 7,359,714 | B2 * | 4/2008 | Parupudi et al. | 455/456.1 |
| 7,415,104 | B2 | 8/2008 | Gray et al. | |
| 7,509,093 | B2 | 3/2009 | Persson et al. | |
| 2004/0203664 | A1 * | 10/2004 | Lei et al. | 455/414.1 |
| 2006/0046707 | A1 | 3/2006 | Malamud et al. | |
| 2006/0085419 | A1 | 4/2006 | Rosen | |
| 2006/0123080 | A1 * | 6/2006 | Baudino et al. | 709/204 |

(Continued)

FOREIGN PATENT DOCUMENTS

| JP | 2006020304 A | 1/2006 |
|---|---|---|
| JP | 2006135715 A | 5/2006 |
| JP | 2008522518 A | 6/2008 |
| WO | WO-2006058822 A1 | 6/2006 |

OTHER PUBLICATIONS

Eagle et al, "Social Serendipity: Mobilizing Social Software", Pervasive Computing, pp. 28-34, 2005.

(Continued)

*Primary Examiner* — Ajit Patel
(74) *Attorney, Agent, or Firm* — Kevin T. Cheatham

(57) ABSTRACT

A first mobile device (for example, a cellular telephone) learns of the presence of second mobile devices (for example, other cellular telephones) that are located nearby the first mobile device. A relatively short range wireless communication mechanism (for example, Bluetooth) of the mobile devices may be used to discover other nearby devices automatically by establishing direct mobile-to-mobile communications without use of the cellular telephone functionality of the mobile devices. Regardless of how the presence of other nearby mobiles is detected, information on the presence of these nearby mobiles can be matched with other information on the users of the nearby mobiles such as user class information. The collected information is then used as an input to a context-aware functionality. The context-aware functionality applies a rule that causes the first mobile to be configured in a way that is better suited the situation and/or to who the other nearby cellular telephone users are and what they are doing.

30 Claims, 6 Drawing Sheets

(56) References Cited

U.S. PATENT DOCUMENTS

2007/0232347 A1* 10/2007 Persson et al. ............. 455/550.1
2007/0242061 A1    10/2007 Rhoten et al.
2010/0211695 A1*  8/2010 Steinmetz et al. ............ 709/242

OTHER PUBLICATIONS

Bokharouss et al, "A Location-Aware Mobile Call Handling Assistant", 21st International Conference on Advanced Information Networking and Applications Workshops, IEEE Computer Society, vol. 2, pp. 282-289, May 21-23, 2007.

Aalto et al., "Bluetooth and WAP Push Based Location-Aware Mobile Advertising System", MobiSYS'04, Boston, MA, Jun. 6-9, 2004.

Bardram et al., "The Aware Architecture: Supporting Context-Mediated Social Awareness in Mobile Cooperation", date unknown, downloaded Jan. 2010.

Zhang et al., "Towards Pervasive Instant Messaging and Presence Awareness", J. Pervasive Comput. & Comm., pp. 1-10, Mar. 2005.

International Search Report and Written Opinion—PCT/US2011/021578—ISA/EPO—Apr. 26, 2011.

Taiwan Search Report—TW100101886—TIPO—Jan. 9, 2014.

* cited by examiner

MOBILE USES LOCAL WIRELESS
COMMUNICATION LINKS TO
BECOME AWARE OF OTHER
NEARBY MOBILES

MOBILE USES CELLULAR
NETWORK TO BECOME AWARE
OF OTHER NEARBY MOBILES

MOBILE USES WIRELESS LOCAL AREA NETWORK
TO BECOME AWARE OF OTHER NEARBY MOBILES

MOBILES HAVE SIMILAR TIMED
MOVEMENT ALONG SIMILAR PATH

MOBILES HAVE SIMILAR TIMED
MOVEMENT ALONG SIMILAR PATH

MOBILES HAVE SIMILAR TIMED
ACCELERATION

MOBILES HAVE SIMILAR KNOWN
LOCATION

CONTEXT-AWARE MOBILE INCORPORATING PRESENCE OF OTHER MOBILES INTO CONTEXT

CROSS-REFERENCE TO RELATED APPLICATION

This application claims the benefit under 35 U.S.C. §119 of Provisional Application Ser. No. 61/295,992, filed Jan. 18, 2010, entitled "Context-Aware Mobile Incorporating Presence Of Other Mobiles Into Context", by Rajarshi Gupta, said provisional application is incorporated herein by reference.

BACKGROUND INFORMATION

1. Technical Field

The disclosed embodiments relate to context-aware mobile communication devices and systems.

2. Background Information

Communication systems exist that learn about their environments and operating conditions. Mobile communication devices of such systems may communicate information and take other actions in different ways depending on the "context" in which the mobile communication device finds itself. Such communication systems are therefore often referred to as "context-aware" communication systems. To determine what action a mobile communication device should take in a given circumstance, one or more rules are applied using the context information as input variables to the rules. The location of the communication device may be a part of the context and in such a case the mobile communication devices are said to be "location-aware." The mobile communication devices may be cellular telephones that include buddy lists, where how an incoming call or email is routed depends on numerous aspects of the context including the location of cellular telephone and a buddy list stored in the cellular telephone. Such context-aware systems are generally complex server/client systems of networked devices, where the actions taken by individual client devices typically involve determining how incoming calls and other information will be communicated to and/or displayed to a user of the client device. Despite existence of the general concept of context-aware computing systems that use presence and location information, existing real-world context-aware systems are expensive to implement, cumbersome to use, and fail to solve many problems in common real-world operating situations. Maintaining historical user location information on a server in such a system raises privacy concerns. Reliance on a central server has reliability ramifications. As a result, context-aware systems that use presence and location information have generally been confined to instant messaging systems and location-aware advertising systems.

SUMMARY

A first mobile device (for example, a cellular telephone) learns of the presence of second mobile devices (for example, other cellular telephones) that are located nearby. In one example, a relatively short range wireless communication mechanism (for example, Bluetooth) of the mobile devices is used to discover other nearby devices automatically by establishing direct mobile-to-mobile communications without use of the main cellular telephone functionality of the mobile devices. Regardless of how the presence of other nearby mobiles is detected, information on the presence of these nearby mobiles can be matched with other information on the users of the nearby mobiles. In some embodiments, the presence information is used to determine whether a user of each nearby mobile likely belongs to a class of users. A table stores, for each mobile, user identity information, user class information, and mobile presence information (for example, whether the mobile is in Bluetooth range of the first mobile device). A rule of a context-aware functionality uses the information in the table along with other inputs to determine an action. The action changes the behavior of the mobile device so that the mobile is better suited to the situation and/or environment of the mobile device. For example, the mobile device can be made to filter incoming emails or incoming calls differently depending on a determined activity that the user of the mobile is engaged in. The likely activity of the user is determined by the context-aware functionality based at least in part on whether other mobile devices are determined to be nearby, and based at least in part on the identities and likely classes of the users of those mobile devices. The action may, for example, involve making the mobile change ring tones, making the mobile change its call handling settings, making the mobile change its speakerphone operation, and/or making the mobile change how call information is displayed on the mobile device. In one advantageous aspect, the context-aware functionality is a thin application that can be inexpensively deployed on a cellular telephone and can be used without requiring cooperation of a cellular telephone network operator.

In a first use case, a mobile device becomes aware of other mobile devices and determines based on changing location information that the users of the mobile devices must be traveling together in a vehicle. If an incoming call is received that is appropriate to be heard by all detected occupants of the vehicle, then a rule applied causes the mobile device to use the vehicle's speaker system for a hands-free call. If, however, the incoming call is not appropriate to be heard by all detected occupants of the vehicle, then application of the rule causes the call to be received in a more private fashion without use of the vehicle speaker system.

In a second use case, the rule and resulting action may cause the mobile device to operate as a sort of virtual secretary or privacy manager that filters and/or prioritizes incoming calls and emails, depending on the context of the mobile device, the nearby mobile devices, and the profiles of the users of the nearby mobile devices. If, for example, an email is received that is sent to five people who are in the same meeting room, then the rule determines that the email is important enough to display, whereas otherwise the email is not displayed to the user. If, for example, an incoming call is received when the user is determined to be in a meeting based on detected nearby mobile devices, then the incoming call is put through to voicemail, unless the incoming call is from the user's boss in which case the call is accepted.

In a third use case, if a user of a mobile device is walking down a street on an outing with the user's family (other family members have mobile devices that are detected to be nearby), then the user's mobile device displays ice cream parlors or destinations that the family may be interested in, whereas if the user of the mobile device is walking down the same street with the user's business colleagues (colleagues have mobile devices that are detected to be nearby), then the user's mobile device displays destinations that business cohorts may be more interested in.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
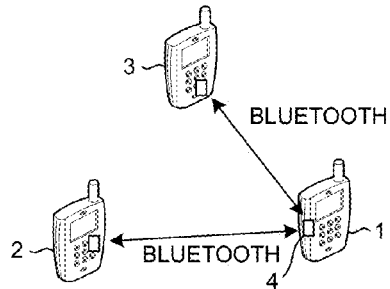
FIG. 1 is a first way that a mobile communication device 1 can become aware of other nearby mobile communication devices.
Figure 2:
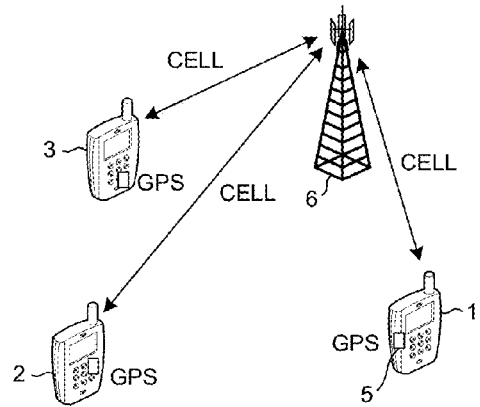
FIG. 2 is a second way that a mobile communication device 1 can become aware of other nearby mobile communication devices.
Figure 3:
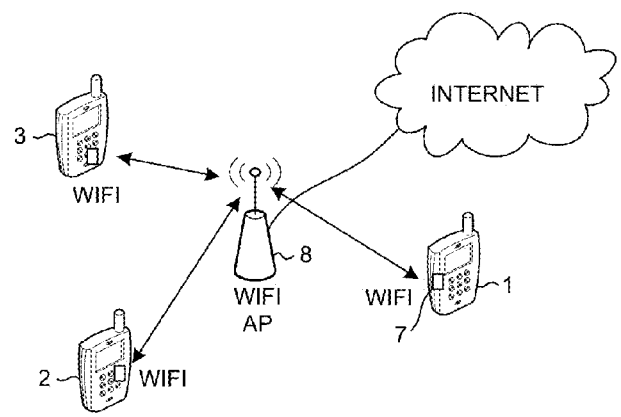
FIG. 3 is a third way that a mobile communication device 1 can become aware of other nearby mobile communication devices.

FIGS. 1, 2 and 3 show three ways that a first mobile communication device 1, in accordance with one novel aspect, can become aware of second mobile communication devices 2 and 3 located nearby the first mobile communication device 1. FIG. 1 illustrates how first mobile communication device 1 detects nearby second mobile communications devices 2 and 3 using Bluetooth communications. Each mobile communication device has a Bluetooth transceiver and communication functionality. Block 4 represents the Bluetooth communication functionality 4 within first mobile communication device 1. When device 1 enters the Bluetooth communication range of devices 2 and 3, periodic device inquiry broadcasts by device 1 are received by the other devices 2 and 3. Each other device responds to such a device inquiry by sending back a response. The response contains position information indicative of the position of the originator of the response. The response also contains an identifier that uniquely identifies the originator. In this way, a mobile communication device 1 that has a Bluetooth communication functionality can become aware of the presence of other nearby Bluetooth-enabled mobile communication devices 2 and 3. Whether or not the devices 2 and 3 are determined to be nearby (or in the "presence of") mobile communication device 1 is determined by whether or not Bluetooth communication can be established between the devices. If Bluetooth communication can be established, then it is determined that the second mobile communication device must be nearby the first mobile communication device. If Bluetooth communication cannot be established, then it is determined that the second mobile communication device is not nearby the first mobile communication device.

FIG. 2 illustrates another way that first mobile communication device 1 can become aware of other nearby second mobile communication devices 2 and 3. In the example of FIG. 2, each mobile communication device is a cellular telephone that has a Global Positioning System (GPS) functionality. The GPS functionality of first mobile communication device 1 is identified by reference numeral 5. Each cellular telephone reports its location, as determined by its GPS functionality, via a cellular telephone communication link to a base station 6 of the cellular telephone network. The locations of mobile communication devices 2 and 3 are then relayed via the cellular telephone network to mobile communication device 1. Mobile communication device 1 is aware of its own location by virtue of information generated by its own GPS functionality 5. First mobile communication device 1 can therefore compare the GPS location information of all the devices 1-3 to determine that devices 2 and 3 are nearby (in the "presence of") device 1.

FIG. 3 illustrates another way that first mobile communication device 1 can become aware of other nearby second mobile communication devices 2 and 3. In the example of FIG. 3, each mobile communication device is a cellular telephone that has a wireless LAN (Local Area Network) functionality by which it can communicate with an Access Point 8 of the wireless LAN. The wireless LAN functionality of first mobile communication device 1 is represented by reference numeral 7. Mobile communication device 1 is aware that it is close to Access Point 8 by virtue of its being in RF communication with Access Point 8. Similarly, mobile communication devices 2 and 3 also are aware that they are close to Access Point 8 because they are in RF communication with Access Point 8. Devices 2 and 3 communicate their locations via Access Point 8 to first mobile communication device 1. Because the communication range of the RF WiFi communication between a mobile unit and an Access Point is limited, the communication between the second mobile communication devices 2 and 3 and Access Point 8 is usable to indicate that devices 2 and 3 are nearby (in the presence of) first device 1.

Regardless of how first mobile communication device 1 becomes aware of the other nearby mobile communication devices 2 and 3, mobile communication device 1 uses this "presence" information to determine an action to take. In a typical implementation, the knowledge of nearby mobile communication devices 2 and 3 is used, along with other information on the likely owners and users of devices 2 and 3, as inputs to a "rule". Application of the rule, using the supplied context of input information (input information including knowledge that mobile communication devices 2 and 3 are nearby) outputs an indication of an action to be taken. The action changes the behavior of first mobile communication device 1.

Figure 4:
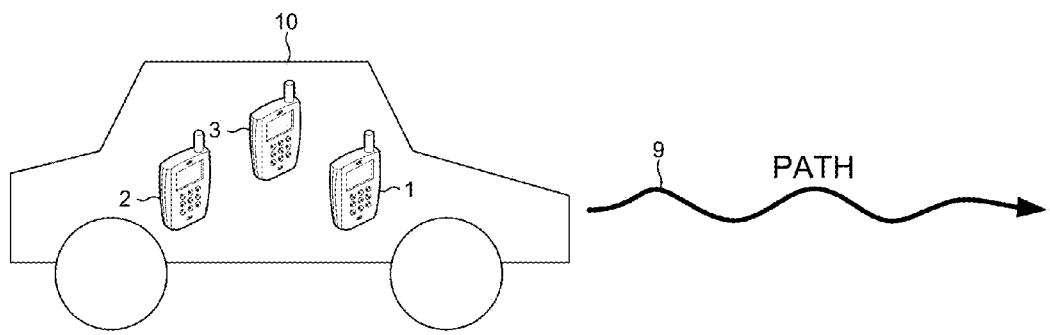
FIG. 4 illustrates how knowledge of mobile communication devices 2 and 3 being nearby mobile communication device 1 can be used by mobile communication device 1 to determine a context of mobile communication device 1.

FIG. 4 illustrates how knowledge of mobile communication devices 2 and 3 being "nearby" mobile communication device 1 can be used to determine a context of mobile communication device 1. Each of mobile communication devices 2 and 3 is detected to be close to mobile communication device 1. Moreover, both of the two mobile communication devices 2 and 3 over time are detected to travel in the vicinity of mobile communication device 1 as mobile communication device 1 travels. If, for example, application of a rule within mobile communication device 1 determines that all three mobile communication devices 1-3 are moving together, and at speeds in excess of walking speeds, and are traveling along the path 9 of a road or highway, then the rule may cause mobile communication device 1 to change its operation in a way suitable to the user of mobile communication device 1 being in a vehicle 10 along with the users of mobile communication devices 2 and 3. The rule may cause different actions to be taken depending on who the likely users of the detected mobile communication devices 2 and 3 are. If, for example, an incoming call or communication is determined to be appropriate for hearing by the others in vehicle 10 (as determined by who the users of the detected second mobile communication devices are), then the rule may cause mobile communication device 1 to operate in speakerphone mode such that the users of second mobile communication devices 2 and 3 can also take part in the call. If, on the other hand, the incoming call or communication is not appropriate for hearing by everyone detected to be in vehicle 10, then the rule may cause mobile communication device 1 to operate in non-speakerphone mode or in another relatively private mode such that the users of second mobile communication devices 2 and 3 cannot take part in or hear the call. How calls are handled can be tailored depending on the class and identities of the owners of the mobile communication devices detected to be present in the vehicle.

Alternatively, if the default mode of answering a call is speakerphone mode, but if mobile communication device 1 detects a nearby mobile communication device that is likely owned by a user who should not hear the content of an incoming call, then the rule applied causes mobile communication device 1 to switch from speakerphone mode to a more private normal mode. The rule can use information on the identity of the sender of the incoming call, the identity of the owner of mobile communication device 1, and the identity of the owners of detected nearby cellular telephones 2 and 3 to make the determination as how the incoming call is to be handled.

Figure 5:
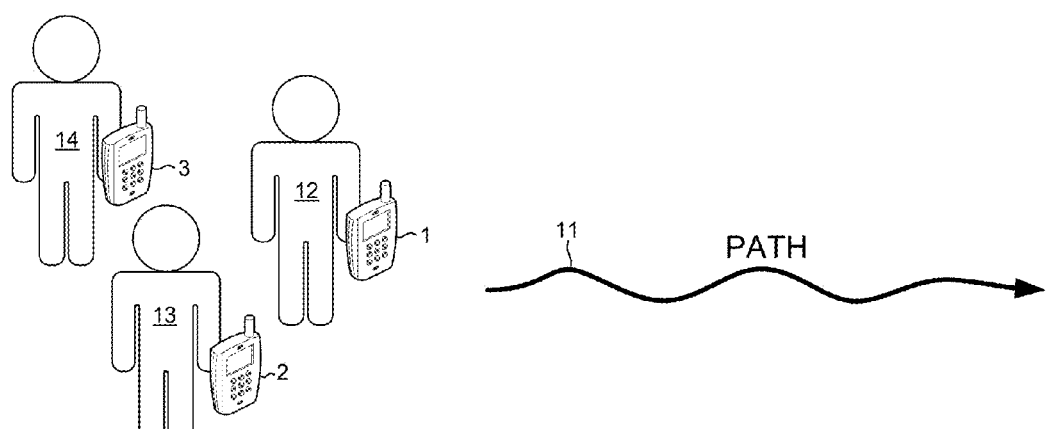
FIG. 5 illustrates another way that knowledge of mobile communication devices 2 and 3 being nearby mobile communication device 1 can be used by mobile communication device 1 to determine a context of mobile communication device 1.

FIG. 5 illustrates how knowledge of mobile communication devices 2 and 3 being near to mobile communication device 1 can be used to determine a context of mobile communication device 1. In the situation of FIG. 5, individuals carrying the mobile communication devices 1-3 are walking together along a path 11. Due to the speed of movement, and perhaps the path 11 extending away from a suitable thoroughfare for a motor vehicle, it can be concluded that the users 12-14 of the devices 1-3 are walking together. The users 12-14 may, for example, be a family that is shopping together or otherwise walking more or less together along path 11. In the same way that the rule in the example of FIG. 4 may cause the mobile communication device to operate in a mode that is suitable based on the identities of the users of devices 1-3, and based on the likely activity and environment of that the users of devices 1-3 are in, so too does the rule in the example of FIG. 5 cause the mobile communication device 1 to operate in a suitable mode for the users 12-14 and environment of devices 1-3.

Figure 6:
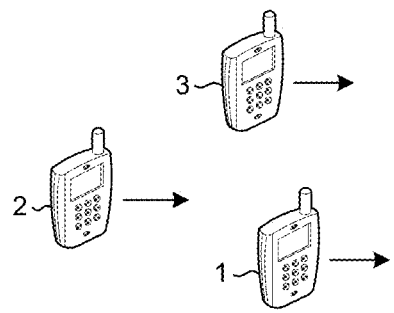
FIG. 6 illustrates another way that mobile communication device 1 can determine that it is traveling with, or is associated with, other mobile communication devices 2 and 3.

FIG. 6 illustrates another way that mobile communication device 1 can determine that it is traveling with, or is associated with, other mobile communication devices 2 and 3. In the example of FIG. 6, all devices 1-3 have similar accelerometers. If devices 2 and 3 report accelerating in similar fashion to the way device 1 detects that it is accelerating, and if the timing and history of such accelerations match or are suitably similar, then mobile communication device 1 can determine that the user of device 1 is involved in an activity with the users of devices 2 and 3. Application of a rule in device 1 causes device 1 to operate in a mode that is appropriate for a condition of the users of devices 1-3 and the determined likely activity of the users.

Figure 7:
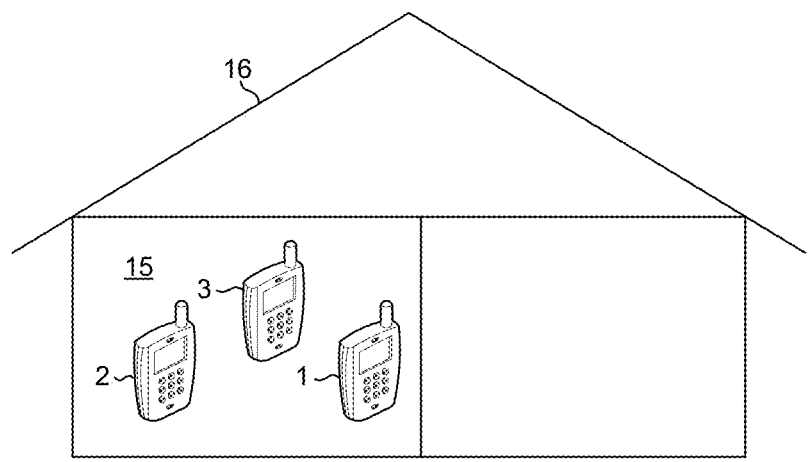
FIG. 7 illustrates another way that mobile communication device 1 can determine that its user is interacting with the users of devices 2 and 3.

FIG. 7 illustrates another way that mobile communication device 1 can determine that its user is interacting with the users of devices 2 and 3. In the example of FIG. 7, all the users are of the same class of users (for example, all are co-workers) and mobile communication devices 2 and 3 are detected to be located in the same location (for example, in a conference room 15 in a building 16 in which co-workers work). Based on this detected context information, mobile communication device 1 can use a rule to determine that the user of device 1 is involved in an activity with the users of devices 2 and 3. The output of the rule causes device 1 to operate in a mode that is suitable for determined location and situation. For example, if a personal incoming telephone call is received onto device 1 from a family member of the user of device 1, and if user 1 is at the user's place of business 16 attending a scheduled business meeting, and if the other users of other nearby devices 2 and 3 are determined to be co-workers, then application of a rule on device 1 may cause the call to go straight to voicemail without causing an audible ring on device 1 that would disturb the meeting. If, on the other hand, the incoming telephone call is from another co-worker or the user's boss, then the call is not routed into voicemail but rather does make an audible ring so the user can pick up the call.

Figure 8:
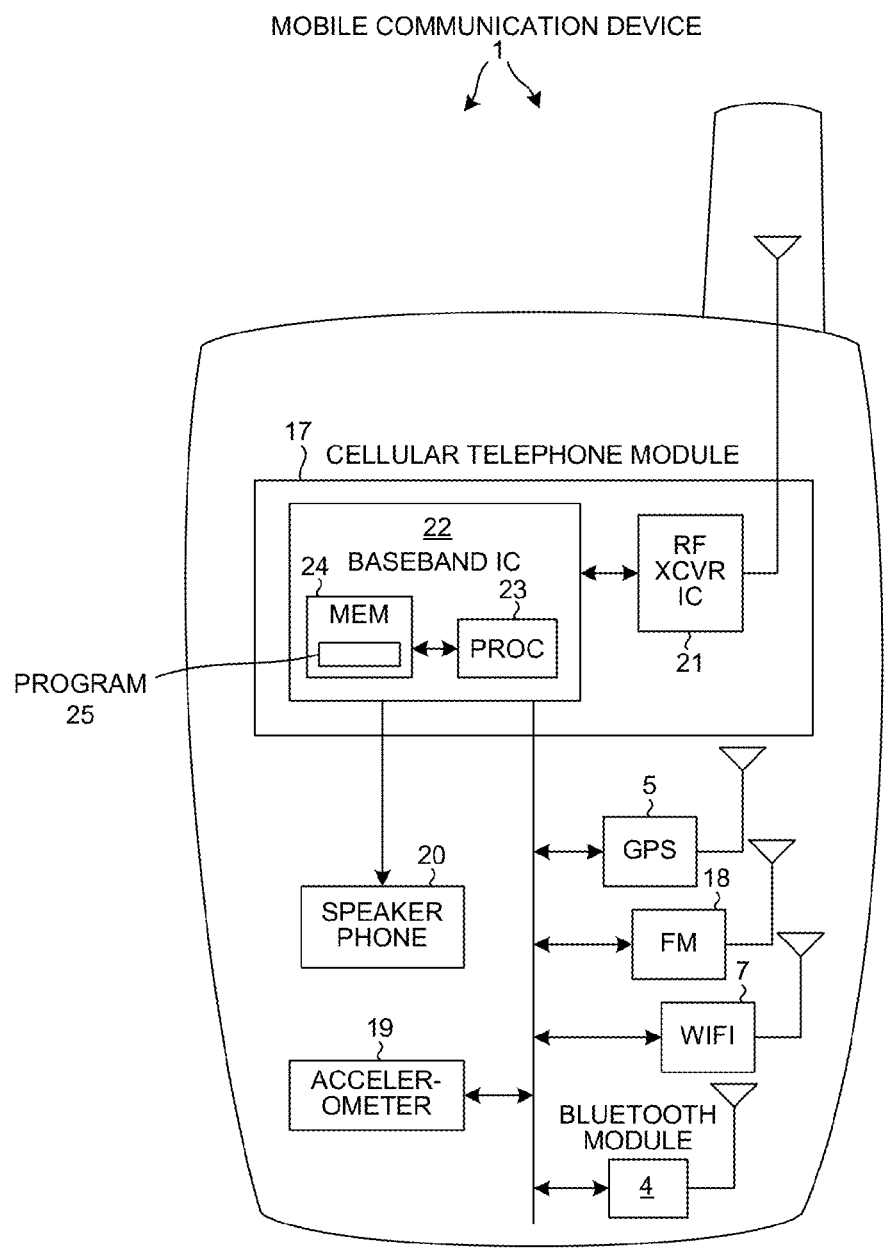
FIG. 8 is a simplified diagram of mobile communication device 1.

FIG. 8 is a simplified diagram of mobile communication device 1. Mobile communication device 1 is a cellular telephone that includes, among many other components not illustrated, a cellular telephone module 17, the GPS functionality 5, an FM transmitter functionality 18, the WiFi transceiver functionality 7, the Bluetooth transceiver functionality 4, an accelerometer 19, and a speakerphone 20. Cellular telephone module 17 in turn includes an RF transceiver integrated circuit 21, and a digital baseband integrated circuit 22. Digital baseband integrated circuit 22 includes a processor 23 and an amount of memory 24. A program of processor-executable instructions 25 (i.e., software or firmware) is stored in memory 24 and is executed by processor 23. Memory 24 is a processor-readable medium.

Figure 9:
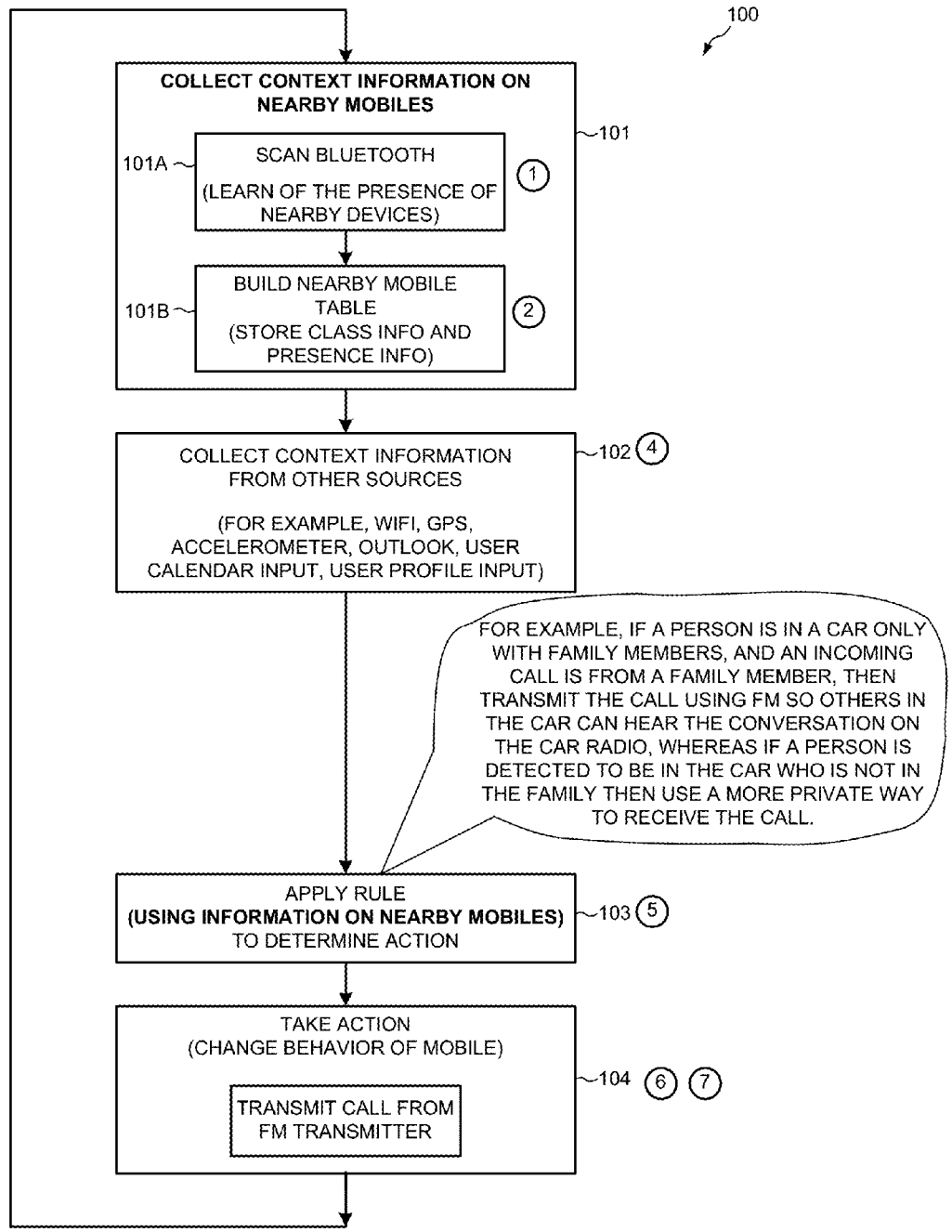
FIG. 9 is a simplified flowchart of a method 100 of operation of the software 25 of FIG. 8.
Figure 10:
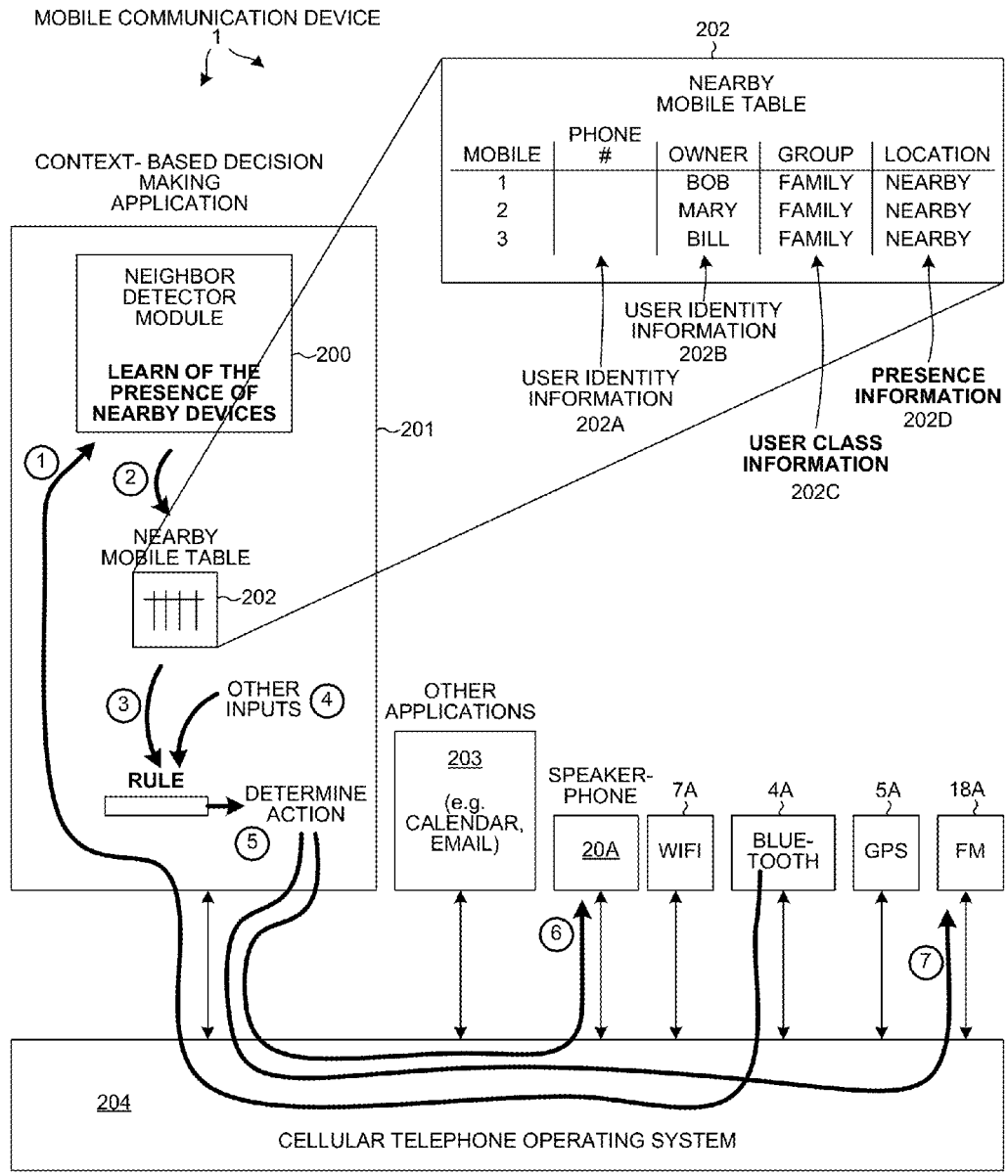
FIG. 10 is a diagram that shows the structure of the software 25 and depicts a sequence of steps in the method 100 of FIG. 9.

FIG. 9 is a simplified flowchart of a method 100 of operation of the software 25 of FIG. 8. FIG. 10 is a diagram that shows the structure of the software 25 and depicts a sequence of steps in the method 100 of FIG. 9. The numerals 1-7 that appear in circles in the diagram of FIG. 10 correspond to the numerals 1-7 that appear in circles in the flowchart of FIG. 9. Blocks 20A, 7A, 4A, 5A, and 18A in FIG. 10 represent software interfaces to associated hardware. Block 20A, for example, represents the software interface for the speakerphone 20 of FIG. 8. Applications 201 and 203, and interfaces 20A, 7A, 4A, 5A, and 18A all interface with and intercommunicate through the operating system 204 of mobile 1.

In a first step (step 101), the first mobile communication device 1 learns of the presence of other nearby second mobile communication devices 2 and 3. In the particular example illustrated, Bluetooth functionality 4 is used to scan for (step 101A) and detect other nearby mobile communication devices 2 and 3. Each other mobile communication device that has a similar Bluetooth functionality responds by communicating back its own globally-unique identifier. A neighbor detector module 200 within context-based decision making application 201 determines that devices 2 and 3 are nearby (in the "presence of") mobile communication device 1 due to the relatively short range communication range of the Bluetooth communication being used. Any mobile communication device that is close enough to be contacted using Bluetooth is determined to be nearby. In another example, a proximity detection method other than Bluetooth is used.

A table 202 is built (step 101B) in mobile communication device 1 that contains an entry for each detected nearby mobile communication device. In the present example, application 203 beforehand had used backchannel cellular communications via the internet to exchange calendar information and user mobile information with the users of devices 2 and 3. Each user previously deposited calendar information and profile information on a server on the internet for later access. This information was then shared with and downloaded into mobile communication device 1. Once mobile communication device 1 receives the profile information for devices 2 and 3, this information is used to populate table 202. User-entered or automatically-generated buddy lists that include other information on the users of mobile communication devices may also be used to populate table 202.

In the example of FIG. 10, once this calendar and profile information is received onto mobile communication device 1 (for example, through a common server on the internet or directly by Bluetooth between mobile devices), the globally-unique identifiers for the detected mobiles 2 and 3 are used to match calendar and profile information with detected mobile. Information including the following is stored in table 202: the telephone number of the mobile 202A, the identity of the user of the mobile 202B, the class of the user of the mobile 202C, and presence information on the location of the mobile 202D. In the example illustrated in FIG. 10, one class is "FAMILY", and another class is "FRIEND", and another class is "COLLEAGUE". All of the devices 1, 2 and 3 in this example are determined to be used by users in the same "FAMILY" class. The "location" information in the table is determined based on whether a device is within Bluetooth communication range of the first mobile communication device. In addition, the location information can be supplemented or may involve GPS information, or other location information derived from other sources. Block 101 in FIG. 9 represents the collecting of information using direct mobile-to-mobile wireless communication using Bluetooth, whereas block 102 represents the collection of additional context information from other sources. Information in table 202 can be updated based on this additional information context information.

Next (step 103), knowledge of the presence of nearby mobiles and user information on the nearby mobiles (such as user identity information and/or user class information) are used as inputs to a rule. Application of the rule determines an action to be taken.

Next (step 104) the action is taken. The action causes mobile 1 to change its behavior. In the present example, where three mobile devices 1-3 are detected to track together along path 9 (see FIG. 4) at a speed appropriate for travel in motor vehicle 10, and where all mobile devices 1-3 are determined by virtue of table 202 to be used by members of the same family, and where an incoming call coming into mobile 1 is also be received from another family member (for example, as detected to the caller ID phone number of the incoming call), then the rule of step 103 determines that the content of the call should be transmitted via FM module 18 so that the conversation can be heard by all occupants of vehicle 10 on the FM car radio of vehicle 10. The microphone of mobile 1 continues to be used so that the speech of occupants of vehicle 10 will be picked up and communicated as part of the call.

If, on the other hand, mobile 1 had detected the presence of a mobile in the vehicle whose owner should not be able to listen into the call, then application of the rule would not have resulted in transmitting the call via FM or operating mobile in speakerphone mode. The action would have been to put mobile 1 into a more private operating mode.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one specific example, memory 24 of FIG. 8 is a computer-readable medium that stores a program 25 of computer-executable instructions, where program 25 is accessed and executed by processor 23 of FIG. 8, and where execution of program 25 causes the method of FIG. 9 to be carried out.

Although certain specific embodiments are described above for instructional purposes, the teachings of this patent document have general applicability and are not limited to the specific embodiments described above. The use of 1) presence information on nearby mobile devices as detected by the short range wireless communication mechanisms of nearby mobile devices and 2) matched user information on the users of the detected nearby devices as inputs to a context-aware functionality has general applicability. A rule of a context-aware functionality may use the presence information and the matched user information to determine the likely activity engaged in by the user of a mobile device and to determine how to configure the mobile device in a way that is more suitable or appropriate for the determined situation. The rule and resulting action may cause the mobile device to operate as a sort of virtual secretary that filters and prioritizes incoming calls and emails, depending on the context of the mobile device. Accordingly, various modifications, adaptations, and combinations of the various features of the described specific embodiments can be practiced without departing from the scope of the claims that are set forth below.

What is claimed is:

1. A method, comprising:
    learning of a presence of a second mobile communication device that is within a relatively small distance of a first mobile communication device, wherein the first mobile communication device is configured to transmit cellular telephone signals to a cellular telephone base station located at a relatively larger distance from the first mobile communication device;
    storing, by the first mobile communication device, first information indicative of whether the second mobile communication device is within a predefined proximity range of the first mobile communication device;

storing, by the first mobile communication device, second information indicative of whether an owner of the second mobile communication device belongs to a class of users;

collecting context information of the first mobile communication device; and using the first information, the second information, and the context information to determine how to change a behavior of the first mobile communication device.

2. The method of claim 1, wherein the learning of the presence of the second mobile communication device that are within the relatively small distance of the first mobile communication device occurs without sending or receiving a cellular telephone communication by the first mobile communication device.

3. The method of claim 2, wherein the learning of the presence of the second mobile communication device includes communicating with the second mobile communication device using a short range wireless communication protocol, and the short range wireless communication protocol is taken from the group consisting of: a Bluetooth protocol, a WiFi protocol, a WiMAX protocol, and a ZigBee protocol.

4. The method of claim 1, wherein the first information includes an indication of whether the second mobile communication device is in a Bluetooth wireless communication range of the first mobile communication device.

5. The method of claim 1, wherein the first information includes an indication of whether each of a plurality of other mobile communication devices is located nearby the first mobile communication device.

6. The method of claim 1, wherein the second information includes a telephone number associated with the second mobile communication device.

7. The method of claim 1, wherein the second information includes a Bluetooth globally-unique identifier associated with the second mobile communication device.

8. The method of claim 1, wherein the first mobile communication device uses a Bluetooth globally-unique identifier of the second mobile communication device to determine whether the owner of the second mobile communication device belongs to the class of users.

9. The method of claim 1, wherein the change of behavior is taken from the group consisting of: (1) reporting information to an originator of a telephone call made to the first mobile communication device, where the information reported indicates a status of the first mobile communication device, (2) reporting information to an originator of a telephone call made to the first mobile communication device, where the information reported indicates a status of a user of the first mobile communication device, (3) modifying operation of the first mobile communication device such that a call received by the first mobile communication device is blocked, (4) modifying operation of the first mobile communication device such that a call received by the first mobile communication device is not blocked, (5) changing whether a call received by the first mobile communication device is diverted, (6) changing whether an email addressed for a user of the first mobile communication device is blocked, (7) changing whether an email addressed to a user of the first mobile communication device is diverted, (8) changing whether a speakerphone is used in a call received by the first mobile communication device, (9) changing a ringtone used to alert a user of the first mobile communication device of an incoming call, (10) changing how information relating to a telephone call is displayed on the first mobile communication device, and (11) changing whether information from a call received by the first mobile communication device is forwarded in a frequency modulated (FM) transmission.

10. The method of claim 1, wherein:
the relatively small distance is a communication range of a short range wireless communication technology taken from the group of: Bluetooth, WiFi, and WiMAX;
the communication range is less than one thousand feet; and
the relatively larger distance is substantially greater than one thousand feet.

11. The method of claim 1, further comprising storing a list of identifiers in the first mobile communication device, wherein there is one identifier for the second mobile communication device, and the first mobile communication device also stores an indication of a class of user of the second mobile communication device.

12. A method, comprising:
using a first short range wireless communication mechanism on a first cellular telephone to learn of a presence of second cellular telephone that is nearby the first cellular telephone, wherein the first short range wireless communication mechanism uses a protocol taken from the group consisting of: a Bluetooth protocol, a WiFi protocol, a WiMAX protocol, and a ZigBee protocol;
storing, for the second cellular telephone, class information indicative of a class of a user of the second cellular telephone; and
changing, based on the class information for each of the second cellular devices and on context information of the first cellular telephone, how an incoming call coming into the first cellular telephone is handled, wherein the storing and the changing are performed by the first cellular telephone.

13. The method of claim 12, wherein the indication of the class is an indication of whether the user of the second cellular telephone is likely in a group of people, wherein the group of people is taken from the group consisting of: a family, a group of co-workers, and a group of friends.

14. A first mobile communication device, comprising:
an integrated circuit configured to:
communicate via a short range wireless communication functionality taken from the group consisting of: a Bluetooth communication functionality, a Wi-Fi communication functionality, a WiMAX communication functionality, and a ZigBee communication functionality;
communicate via a cellular telephone communication functionality;
use the short range wireless communication functionality to learn of a presence of a second mobile communication device that is within a relatively small distance of the first mobile communication device;
determine class information indicative of whether a user of the second mobile communication devices belongs to a class of user;
change a behavior of the first mobile communication device based on the class information and context information of the first mobile communication device.

15. The apparatus of claim 14, wherein the integrated circuit is further configured to learn the presence of the second mobile communication device by establishing direct wireless communication between the first mobile communication device and the second mobile communication device, wherein the direct wireless communication occurs via the short range wireless communication functionality.

16. The apparatus of claim 14, wherein integrated circuit is further configured to learn the presence of the second mobile communication device without receiving or transmitting via the cellular telephone communication functionality.

17. The apparatus of claim 15, wherein the integrated circuit is further configured to classify the second mobile communication device based at least in part on whether the short range wireless communication functionality is usable to establish communication between the first mobile communication device and the second mobile communication device.

18. The apparatus of claim 15, wherein the class information includes an indication of whether a user of the second mobile communication device is likely a member of a group of people, wherein the group of people is taken from the group consisting of: a family, a group of co-workers, a group of friends.

19. The apparatus of claim 15, wherein the change of behavior of the first mobile communication device is a change in how information received by the first mobile communication device via the cellular telephone communication functionality is presented to the user of the first mobile communication device.

20. A method, comprising:
   learning, using a first mobile communication device, of a presence of a second mobile communication device that is within a predefined range of proximity of the first mobile communication device;
   storing, on the first mobile communication device, first information indicative of whether the second mobile communication device is within the predefined range of proximity of the first mobile communication device;
   storing, on the first mobile communication device, second information indicative of whether an owner of the second mobile communication device belongs to a class of users;
   collecting context information of the first mobile communication device; and
   using the first information, the second information, and the context information to determine how to change a behavior of the first mobile communication device.

21. The method of claim 20, wherein the learning of the presence of the second mobile communication device that are within a predefined range of proximity of the first mobile communication device occurs without sending or receiving a cellular telephone communication by the first mobile communication device, and the first mobile communication device learns of the presence of the one or more second mobile communication devices by communicating with the second mobile communication device using a short range wireless communication protocol.

22. A non-transitory computer-readable medium, comprising instructions stored thereon that, if executed by a processor, cause the processor to execute a method comprising:
   learning of a presence of a second mobile communication device that is within a relatively small distance of a first mobile communication device, wherein the first mobile communication device is configured to transmit cellular telephone signals to a cellular telephone base station located at a relatively larger distance from the first mobile communication device;
   storing, by the first mobile communication device, first information indicative of whether the second mobile communication device is within a predefined proximity range of the first mobile communication device;
   storing, by the first mobile communication device, second information indicative of whether an owner of the second mobile communication device belongs to a class of users;
   collecting context information of the first mobile communication device; and
   using the first information, the second information, and the context information to determine how to change a behavior of the first mobile communication device.

23. An apparatus, comprising:
   means for learning of a presence of a second mobile communication device that is within a relatively small distance of a first mobile communication device, wherein the first mobile communication device is configured to transmit cellular telephone signals to a cellular telephone base station located at a relatively larger distance from the first mobile communication device;
   means for storing, by the first mobile communication device, first information indicative of whether the second mobile communication device is within a predefined proximity range of the first mobile communication device;
   means for storing, by the first mobile communication device, second information indicative of whether an owner of the second mobile communication device belongs to a class of users;
   means for collecting context information of the first mobile communication device; and
   means for using the first information, the second information, and the context information to determine how to change a behavior of the first mobile communication device.

24. A first mobile communication device, comprising:
   an integrated circuit configured to:
   learn of a presence of a second mobile communication device that is within a relatively small distance of a first mobile communication device, wherein the first mobile communication device is configured to transmit cellular telephone signals to a cellular telephone base station located at a relatively larger distance from the first mobile communication device;
   store, by the first mobile communication device, first information indicative of whether the second mobile communication device is within a predefined proximity range of the first mobile communication device;
   store, by the first mobile communication device, second information indicative of whether an owner of the second mobile communication device belongs to a class of users;
   collect context information of the first mobile communication device; and
   use the first information, the second information, and the context information to determine how to change a behavior of the first mobile communication device.

25. A non-transitory computer-readable medium, comprising instructions stored thereon that, if executed by a processor, cause the processor to execute a method comprising:
   using a first short range wireless communication mechanism on a first cellular telephone to learn of a presence of second cellular telephone that is nearby the first cellular telephone, wherein the first short range wireless communication mechanism uses a protocol taken from the group consisting of: a Bluetooth protocol, a WiFi protocol, a WiMAX protocol, and a ZigBee protocol;
   storing, for the second cellular telephone, class information indicative of a class of a user of the second cellular telephone; and changing, based on the class information for each of the second cellular devices and on context information of the first cellular telephone, how an incoming call coming into the first cellular telephone is handled, wherein the storing and the changing are performed by the first cellular telephone.

26. An apparatus, comprising:

means for using a first short range wireless communication mechanism on a first cellular telephone to learn of a presence of second cellular telephone that is nearby the first cellular telephone, wherein the first short range wireless communication mechanism uses a protocol taken from the group consisting of: a Bluetooth protocol, a WiFi protocol, a WiMAX protocol, and a ZigBee protocol;

means for storing, for the second cellular telephone, class information indicative of a class of a user of the second cellular telephone; and means for changing, based on the class information for each of the second cellular devices and on context information of the first cellular telephone, how an incoming call coming into the first cellular telephone is handled.

27. A first mobile communication device, comprising:

an integrated circuit configured to:
 use a first short range wireless communication mechanism on a first cellular telephone to learn of a presence of second cellular telephone that is nearby the first cellular telephone, wherein the first short range wireless communication mechanism uses a protocol taken from the group consisting of: a Bluetooth protocol, a WiFi protocol, a WiMAX protocol, and a ZigBee protocol;
 store class information indicative of a class of a user of the second cellular telephone; and
 change, based on the class information for each of the second cellular devices and on context information of the first cellular telephone, how an incoming call coming into the first cellular telephone is handled.

28. A non-transitory computer-readable medium, comprising instructions stored thereon that, if executed by a processor, cause the processor to execute a method comprising:

learning, using a first mobile communication device, of a presence of a second mobile communication device that is within a predefined range of proximity of the first mobile communication device;

storing, on the first mobile communication device, first information indicative of whether the second mobile communication device is within the predefined range of proximity of the first mobile communication device;

storing, on the first mobile communication device, second information indicative of whether an owner of the second mobile communication device belongs to a class of users;

collecting context information of the first mobile communication device; and using the first information, the second information, and the context information to determine how to change a behavior of the first mobile communication device.

29. An apparatus, comprising:

means for learning, using a first mobile communication device, of a presence of a second mobile communication device that is within a predefined range of proximity of the first mobile communication device;

means for storing, on the first mobile communication device, first information indicative of whether the second mobile communication device is within the predefined range of proximity of the first mobile communication device;

means for storing, on the first mobile communication device, second information indicative of whether an owner of the second mobile communication device belongs to a class of users;

means for collecting context information of the first mobile communication device; and means for using the first information, the second information, and the context information to determine how to change a behavior of the first mobile communication device.

30. A first mobile communication device, comprising:

an integrated circuit configured to:
 learn, using a first mobile communication device, of a presence of a second mobile communication device that is within a predefined range of proximity of the first mobile communication device;
 store, on the first mobile communication device, first information indicative of whether the second mobile communication device is within the predefined range of proximity of the first mobile communication device;
 store, on the first mobile communication device, second information indicative of whether an owner of the second mobile communication device belongs to a class of users;
 collect context information of the first mobile communication device; and
 use the first information, the second information, and the context information to determine how to change a behavior of the first mobile communication device.

* * * * *